US011500379B2

(12) United States Patent
Posselius et al.

(10) Patent No.: US 11,500,379 B2
(45) Date of Patent: Nov. 15, 2022

(54) MULTIPURPOSE AGRICULTURAL VEHICLE

(71) Applicant: CNH Industrial America LLC, New Holland, PA (US)

(72) Inventors: John H. Posselius, Ephrata, PA (US); Jesse H. Orsborn, Birdsboro, PA (US); Christopher Alan Foster, Akron, OH (US)

(73) Assignee: CNH Industrial America LLC, New Holland, PA (US)

( * ) Notice: Subject to any disclaimer, the term of this patent is extended or adjusted under 35 U.S.C. 154(b) by 609 days.

(21) Appl. No.: 16/303,568

(22) PCT Filed: May 23, 2017

(86) PCT No.: PCT/US2017/034042
§ 371 (c)(1),
(2) Date: Nov. 20, 2018

(87) PCT Pub. No.: WO2017/205403
PCT Pub. Date: Nov. 30, 2017

(65) Prior Publication Data
US 2020/0319637 A1 Oct. 8, 2020

Related U.S. Application Data

(60) Provisional application No. 62/340,920, filed on May 24, 2016.

(51) Int. Cl.
*G05D 1/00* (2006.01)
*B62D 7/14* (2006.01)
*B62D 7/15* (2006.01)

(52) U.S. Cl.
CPC ........... *G05D 1/0088* (2013.01); *B62D 7/142* (2013.01); *B62D 7/1509* (2013.01); *G05D 2201/0201* (2013.01)

(58) Field of Classification Search
CPC ......... G05D 1/0088; G05D 2201/0201; G05D 1/0246; G05D 1/0295; B62D 7/142;
(Continued)

(56) References Cited

U.S. PATENT DOCUMENTS 1,340,461 A * 5/1920 Ronning ................ A01D 67/00
56/14.3
4,932,489 A * 6/1990 Evans .................. B62D 7/1509
180/7.1
(Continued)

FOREIGN PATENT DOCUMENTS

AU 200016446 B2 * 11/1999 ............... B62D 7/15

OTHER PUBLICATIONS

Farm Progress: "Bi-directional tractor", Jul. 8, 2008 website: www. farmprogress.com/tractors/bi-directional-tractor accessed Mar. 26, 2021 (Year: 2008).*
(Continued)

*Primary Examiner* — Peter D Nolan
*Assistant Examiner* — Tanya C Sienko
(74) *Attorney, Agent, or Firm* — Patrick Sheldrake; Peter Zacharias

(57) ABSTRACT

In one embodiment, a vehicle system includes a chassis and a vehicle bed coupled to the chassis, the vehicle bed comprising an attachment system configured to fasten a detachable mission platform onto the vehicle bed. The vehicle system further includes a plurality of wheels coupled to the chassis and configured to carry the chassis over a ground. The vehicle system additionally includes a control system comprising a processor configured to determine a mission type for the detachable mission platform. The processor is additionally configured to communicate with the detachable mission platform to actuate at least one actuator of the detachable mission platform based on the mission type.

19 Claims, 5 Drawing Sheets

(58) Field of Classification Search
CPC ... B62D 7/1509; A01B 59/002; A01B 69/004; A01B 69/008; A01B 79/00; A01D 41/1278; B60P 3/00; B60P 3/22
See application file for complete search history.

(56) References Cited

U.S. PATENT DOCUMENTS

| | | | | |
|---|---|---|---|---|
| 5,456,332 | A * | 10/1995 | Borenstein | G05D 1/0272 180/22 |
| 6,822,582 | B2 * | 11/2004 | Voeller | G07C 5/008 701/29.6 |
| 9,265,187 | B2 * | 2/2016 | Cavender-Bares | A01C 23/024 |
| 9,597,850 | B2 * | 3/2017 | Dedeurwaerder | B30B 9/3007 |
| 9,845,110 | B2 * | 12/2017 | Merkel | B62D 7/1518 |
| 9,891,629 | B2 * | 2/2018 | Murray | A01B 51/026 |
| 2008/0066934 | A1 | 3/2008 | Hou | |
| 2009/0020369 | A1 * | 1/2009 | Warachka | B66F 9/08 187/222 |
| 2009/0120273 | A1 * | 5/2009 | Eckdahl | F41H 7/02 89/1.1 |
| 2014/0116735 | A1 * | 5/2014 | Bassett | A01C 7/203 172/430 |
| 2014/0277675 | A1 * | 9/2014 | Anderson | G05D 1/0212 700/114 |
| 2015/0105963 | A1 * | 4/2015 | Blackwell | G05D 1/0246 701/23 |
| 2015/0237791 | A1 * | 8/2015 | Bassett | A01B 73/005 172/3 |
| 2015/0264866 | A1 | 9/2015 | Foster et al. | |
| 2015/0319913 | A1 | 11/2015 | Foster et al. | |
| 2018/0255705 | A1 * | 9/2018 | Keski-Luopa | A01D 34/008 |

OTHER PUBLICATIONS

"The Five Most Popular Tractor Implements"—Compact Equipment Magazine Mar. 14, 2014 (Year: 2014).*
International Search Report from PCT/US2017\034042, dated May 23, 2017, pp. 3.

* cited by examiner

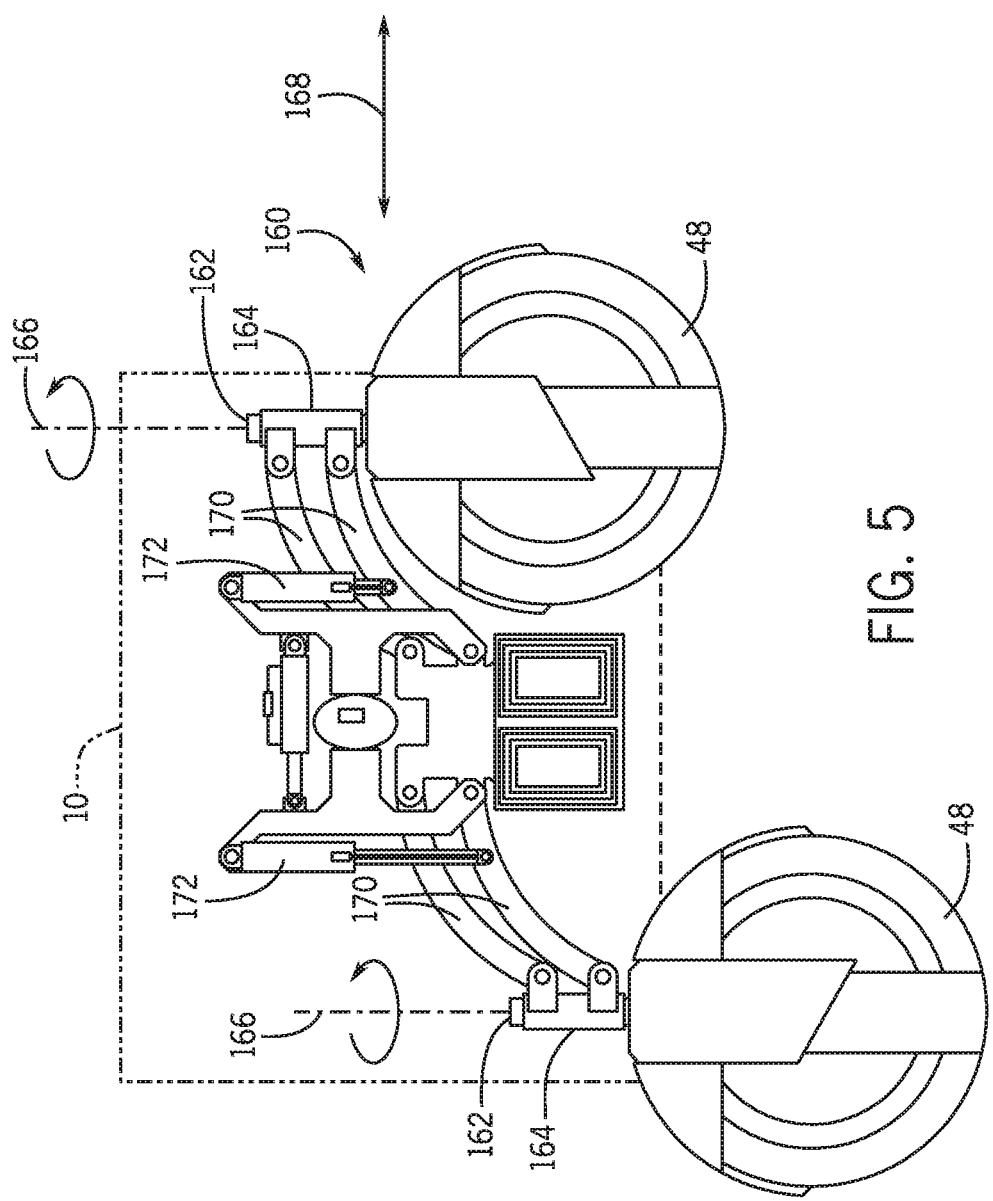

MULTIPURPOSE AGRICULTURAL VEHICLE

CROSS REFERENCE TO RELATED APPLICATIONS

This application is a national stage of PCT Application No. PCT/US2017/34042, entitled "MULTIPURPOSE AGRICULTURAL VEHICLE", filed on May 23, 2017, which claims priority from and the benefit of U.S. Provisional Patent Application Ser. No. 62/340,920, entitled "MULTIPURPOSE AGRICULTURAL VEHICLE", filed May 24, 2016. Each of the foregoing applications is hereby incorporated by reference in its entirety.

BACKGROUND

The present disclosure relates generally to vehicles, and more specifically to multipurpose agricultural vehicles.

Increasing productivity of agricultural operations may be achieved by increasing efficiency of the agricultural vehicles and/or other machines involved. Often specialized machines are used for specific tasks, resulting in an increasing variety of vehicles and/or machines. For example, different vehicle designs exist for grain carts, as compared to crop sprayer support vehicles, seeders/planter support vehicles, and the like. However, increasing the variety of vehicles may typically increase the acquisition and/or operational costs of the fleet of vehicles and/or machines. Additionally, larger agricultural vehicle fleets may be more difficult to store, and transport due to the number of the vehicles/machines. The larger fleets typically use more parking space as well as transport space, for example, when being transported to various fields. Furthermore, maintenance operations may have greater consequences and impact when the agricultural vehicles and/or machines are more numerous, affecting parts procurement efficiency and cost, as well as overall time and cost of maintenance.

BRIEF DESCRIPTION

Certain embodiments commensurate in scope with the present disclosure are summarized below. These embodiments are not intended to limit the scope of the disclosure, but rather these embodiments are intended only to provide a brief summary of possible forms of the disclosure. Indeed, the disclosure may encompass a variety of forms that may be similar to or different from the embodiments set forth below.

In a first embodiment, a vehicle system includes a chassis and a vehicle bed coupled to the chassis, the vehicle bed comprising an attachment system configured to fasten a detachable mission platform onto the vehicle bed. The vehicle system further includes a plurality of wheels coupled to the chassis and configured to carry the chassis over a ground. The vehicle system additionally includes a control system comprising a processor configured to determine a mission type for the detachable mission platform. The processor is additionally configured to communicate with the detachable mission platform to actuate at least one actuator of the detachable mission platform based on the mission type.

In a second embodiment, a vehicle system includes a chassis and a first detachable mission platform comprising at least one actuator. The vehicle system further includes a vehicle bed coupled to the chassis, the vehicle bed comprising an attachment system configured to fasten the first detachable mission platform onto the vehicle bed. The vehicle system additionally includes a plurality of wheels coupled to the chassis and configured to carry the chassis over a ground. The vehicle system also includes a control system comprising a processor configured to determine a mission type for the first detachable mission platform and to communicate with the first detachable mission platform to actuate the at least one actuator of the first detachable mission platform.

In a third embodiment, a vehicle system includes a chassis and a vehicle bed coupled to the chassis, the vehicle bed comprising an attachment system configured to fasten a detachable mission platform onto the vehicle bed. The vehicle system further includes a plurality of wheels coupled to the chassis and configured to carry the chassis over a ground. The vehicle system additionally includes a steering system operatively coupled to the plurality of wheels and communicatively coupled to a control system. The vehicle system also includes the control system comprising a processor configured to execute a crab mode control to drive the vehicle system in a sideways direction via the steering system.

DRAWINGS

These and other features, aspects, and advantages of the present invention will become better understood when the following detailed description is read with reference to the accompanying drawings in which like characters represent like parts throughout the drawings, wherein:

FIG. 5 is a front view of a 4-wheel steering system for the multipurpose vehicle of FIG. 1, in accordance with an embodiment of the present disclosure.

DETAILED DESCRIPTION

Figure 1:
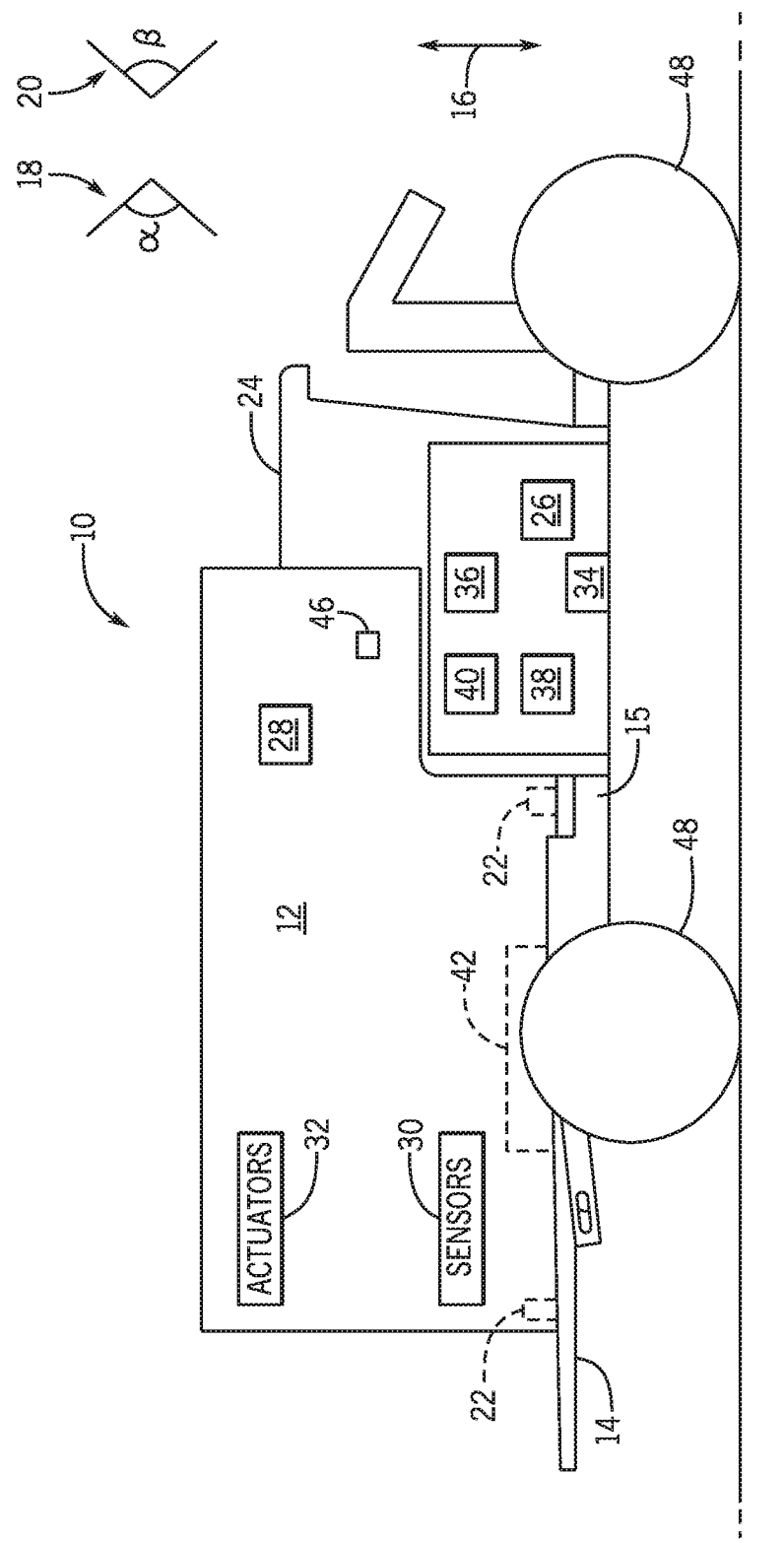
FIG. 1 is a diagram of a multipurpose vehicle having a mission platform attached, in accordance with an embodiment of the present disclosure

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

It may be desirable to have a multipurpose vehicle, such as a multipurpose agricultural vehicle, that may share a common set of components yet provide for "plug-and-play" capabilities suitable for a variety of operations and missions. The techniques described herein provide for a multipurpose vehicle having a self propelled chassis with mission specific "clip-on" platforms. The multipurpose vehicle includes a chassis that contains a power unit, a driveline, an auxiliary power (e.g., hydraulic power, electrical power, mechanical power), an operator interface (e.g. cab, communication panel), a control system, and certain common sensors as described in more detail below. The chassis may provide supports for substantially all of the basic functionalities of each mission. The chassis may be fitted with two or more axles. For example, a large grain cart application may require extra axle(s) for floatation in an agricultural field. The chassis may additionally provide for the option of fitting 4-wheel-steering, for example, to enhance maneuverability.

In certain embodiments, a 4-wheel steering system may include techniques enabling each wheel to independently rotate, for example, 360 degrees or more. The 4-wheel steering system may additionally include an electronic control system suitable for coordinating and controlling the steering of each wheel. The 4-wheel steering system may switch between a regular steering mode and a crab steering mode, as described in more detail below. Accordingly, the chassis would also support all wheel drive to provide for enhanced traction in fields where traction conditions may be poor. The chassis may further include adjustable ground clearance and/or ride height. The ride height may also be adjusted by fitting wheels of different diameters and/or sizes. In one embodiment, the chassis may include an open section in a center portion of the chassis, as this capability would allow, for example, a grain bin to "hang" though, enabling a higher capacity and gravitational unloading through the bottom of the grain bin.

The chassis may support both manned and autonomous/unmanned operations. A sensor system may be used during autonomous (and manned) operations to provide, for example, for obstacle detection, navigation, environmental sensing, and the like. The sensor system may include sensors in the chassis as well as sensors on various mission platforms. These mission or "clip-on" platforms support mission specific tasks such as cotton module transportation, bale stacking (e.g., small square, large square, and round), grain cart operations, crop spraying, sprayer support operations, seeding/planting support operations, and so on. Each "clip-on" platform may include systems containing relevant hardware and specific sensors for each mission.

To improve mission changes in the field, each "clip-on" platform may include its own stowable support structure. The stowable support structure may be folded down (either manually or via powered techniques) and then the mission platform can be lifted off the chassis, for example, using auxiliary power from the chassis. The chassis may then be moved away from the mission platform (which is self supported by its support structure) and into position to 'pick-up' another mission platform.

Turning now to FIG. 1 is a block diagram side view of a multipurpose vehicle 10 (e.g., agricultural vehicle), in accordance with an embodiment of the present disclosure. The multipurpose vehicle 10 may be used in a variety of missions, such as agricultural missions (e.g., as a grain cart, seeder, planter, sprayer, cotton module mover, and so on) and other non-agricultural missions, such as construction, logistic support, and the like. The multipurpose vehicle 10 may provide mission specific support by attaching and carrying a mission or "plug-in" platform 12 that is suitable for providing for specific mission support. That is, a variety of mission platforms 12 may each be constructed to focus on specific operations, such as grain cart operations, seeding operations, planting operations, spraying operations, cotton harvesting/processing, construction operations, logistics operations, and so on. Instead of having a specific vehicle for each type of operation, the techniques described herein enable the single multipurpose vehicle 10 to dock with and carry multiple types of mission platforms 12, thus enabling reuse of certain components, improving maintenance, reducing garage space, and lowering fleet costs.

In the depicted embodiment, the multipurpose vehicle 10 includes a vehicle bed 14 suitable for coupling with and carrying the mission platform 12. The vehicle bed is disposed onto a chassis 15. In operations, the bed 14 may be raised or lowered, for example in an axial direction 16, to more easily load and unload the mission platform 12, as well as for providing various height adjustments of the mission platform 12 during operations. For example, certain operations may benefit from lower heights, while others may benefit from an increased height. The vehicle bed 14 may also be rotatively adjust at various angles 18, 20, for example, to enable a more efficient mounting and/or dismounting of the mission platform 12 onto the vehicle bed 14.

Once the mission platform 12 is disposed onto the vehicle bed 14, the mission platform 12 may be securely attached onto the vehicle bed 14 via attachment systems 22. For example, attachment systems 22 may include latches, pistons, straps, standardized container twistlocks/corner castings (e.g., male and female standardized rotating connectors used by shipping containers), and the like. The attachment systems 22 may be manual attachment systems suitable for locking by human operation, powered attachment systems that may use hydraulic power and/or electrical power, or a combination thereof. The attachment systems 22 may additionally provide for desired position of the mission platform 12 onto the vehicle bed 14, for example, by providing for fastening position points set at certain desired locations.

The multipurpose vehicle 10 may be a manned vehicle and/or an unmanned vehicle. In the depicted embodiment, a cab 24 as shown, useful in manned operations. A human operator may enter the cab 24 and drive the multipurpose vehicle 10, dock/undock the mission platform 12, and/or operate the vehicle 10 with the mission platform 12 attached. Also shown are a control system 26 included in the multipurpose vehicle 10. The control system 26, which is described in further detail below, may include executable instructions or code suitable for driving the multipurpose vehicle 10 autonomously. Likewise, a control system 28 included in the mission platform 12 may be communicatively coupled to the control system 26 and used by the mission platform 12 to provide for certain mission-specific control. For example, the control system 28 may be communicatively coupled to one or more sensors 30 and actuators 32 suitable for providing mission specific sensing and actuation. The sensors 30 may include imaging sensors, rangefinders, sonar, ultrasonic sensors, yield sensors, fluid level sensors, weight sensors, vehicle inclination sensors, temperature sensors, humidity sensors, and so on. The actuators 30 may include sprayers, seed sowers, motors, pumps, robotic arms, and so on, useful in performing a wide variety of automated tasks.

The multipurpose vehicle 10 may also include one or more sensors 34 and one or more actuators 36. The sensors 34 may provide for multi-mission support, and may also include imaging sensors, rangefinders, sonar, ultrasonic sensors, yield sensors, fluid level sensors, weight sensors, vehicle inclination sensors, temperature sensors, humidity sensors, and so on. The actuators 36 may provide support for loading/unloading the mission platform 12, and may include cranes, positioning systems, locking systems, motors, pumps, and the like. Power to operate the multipurpose vehicle 10 may come from a power unit 38, such as a combustion engine, an electrical power source (e.g., battery), or a combination thereof. The multipurpose vehicle 10 may additionally include an auxiliary power unit 40 suitable for providing auxiliary power to the mission platform 12. For example, the auxiliary power unit 40 may provide for mechanical power, hydraulic power, electrical power, or a combination thereof, to the mission platform 12, for example, to drive the actuators 32 and/or sensors 30.

To aid in docking and undocking, the mission platform 12 may include stowable support structure(s) 42 (e.g., manually powered or auxiliary powered), such as foldable legs, retractable pistons, and other support structures suitable for fully supporting the weight of the mission platform 12. In use, the stowable support structure(s) 42 may be deployed, lifting the mission platform 12 above a ground 44. The multipurpose vehicle 10 may then move away and dock with another multipurpose vehicle 10. Once docked, the stowable support structure(s) 42 may be stowed and the mission platform 12 may be securely fastened onto the multipurpose vehicle 10, for example, via the attachment systems 22. During docking operations, a mission platform 12 identification system 46, such as an RFID tag, Wi-Fi tag, may identify a type of mission (e.g., as a grain cart, seeder, planter, sprayer, cotton module, and so on) that the mission platform 12 supports, and provide the information to the control system 26. The control system 26 may then execute certain processes, described in more detail below, suitable for supporting the type of mission being performed. The control system 28 may additionally or alternatively also communicate the mission platform 12 type to the control system 26.

As the multipurpose vehicle 10 is being operated, for example, in an agricultural field, certain techniques may be used to provide for more efficient movement and turning. More specifically, wheels 48 may include 4-wheel-steering. In certain embodiments, a 4-wheel steering system may include techniques enabling each wheel to independently rotate, for example, 360 degrees or more. The control system 26 may include software or computer executable instructions suitable for coordinating and controlling the steering of each wheel 48, including independent steering of each wheel 48. The control system 26 may switch between a regular steering mode and a crab steering mode, as described in more detail below.

Figure 2:
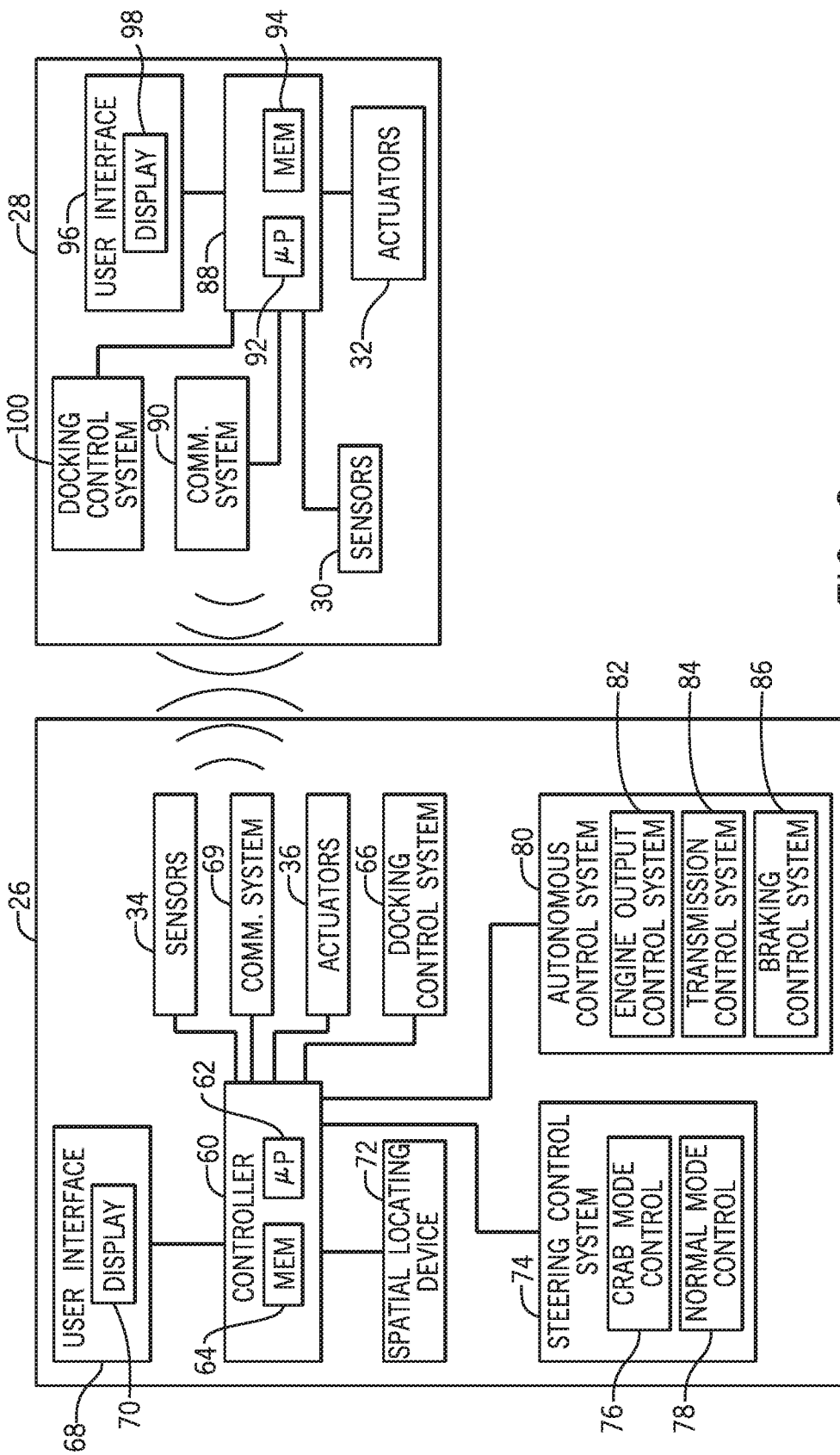
FIG. 2 is a block diagram of an embodiment of control systems for the multipurpose vehicle and the mission platform of FIG. 1.

FIG. 2 is a schematic diagram of an embodiment of the control system 26 and the control system 28 included in the multipurpose vehicle 10 and the mission platform 12, respectively, shown previously in FIG. 1. In the illustrated embodiment, the control system 26 includes a controller 60, such as a hardware-based controller. The controller 60 in turn includes a processor, such as the illustrated microprocessor 62, and a memory 64. The controller 60 may also include one or more storage devices and/or other suitable components. The processor 62 may be used to execute software, such as software for controlling the off-road vehicle 10, and so forth. Moreover, the processor 62 may include multiple microprocessors, one or more "general-purpose" microprocessors, one or more special-purpose microprocessors, and/or one or more application specific integrated circuits (ASICS), or some combination thereof. For example, the processor 62 may include one or more reduced instruction set (RISC) processors.

The memory 64 may include a volatile memory, such as random access memory (RAM), and/or a nonvolatile memory, such as ROM. The memory 64 may store a variety of information and may be used for various purposes. For example, the memory 64 may store processor-executable instructions (e.g., firmware or software) for the processor 62 to execute, such as instructions for operating the multipurpose vehicle 10.

The controller 60 may be communicatively coupled to the sensors 34 and actuators 36. As mentioned previously, the sensors 34 may provide for multi-mission support while the actuators 34, in addition to multi-mission support, may additionally be used in docking/undocking the mission platform 12. Indeed, to aid in docking/undocking the mission platform 12, the control system 26 may include a docking control system 66. The docking control system 66 may include software and/or hardware components useful in attaching the mission platform 12 to the multipurpose vehicle 10, for example, by aiding in proper positioning and/or fastening of the mission platform 12 to the multipurpose vehicle 10.

Additionally, the docking control system 66 may reconfigure the controller 60 once the mission platform 12 is docked. For example, the docking control system 66 may determine the type of mission platform 10 (e.g., a grain cart platform, seeder platform, planter platform, sprayer platform, cotton module platform, and so on), and may then enable the controller 60 to load into the memory 64 an appropriate set of code or instructions suitable for operating the type of mission that the mission platform 12 supports. The processor 62 may then execute the instructions during operations of the multipurpose vehicle 10 to support the specific mission type. The docking control system 66 may not only enable docking support with the mission platform 12, but also docking support with other vehicles and/or structures that the multipurpose vehicle 10 may interact with. For example, the multipurpose vehicle 10 carrying the mission platform 12 may interact with combines, grain elevators, on-road vehicles (e.g., trucks), trains, cotton storage units, and so forth. Accordingly, the docking control system 66 may reconfigure or otherwise reprogram the controller 60 for mission specific interactions with other vehicles or structures based on the mission type supported by the mission platform 12.

In order to operate the multipurpose vehicle 10, a user interface 68 having a display 70 is provided. The user interface may include input devices, such as touchscreens, joysticks, trackballs, keyboards, mice, microphones, and the like, useful in controlling the multipurpose vehicle 10 and/or the mission platform 12. The display 70 may be used to present a graphical user interface suitable for operations of the multipurpose vehicle 10 and/or the mission platform 12. During, for example, docking operations, the user interface 68 may be reprogrammed to the particular mission type being supported. For example, a joystick may be used in a grain cart mission to load/unload grain, while the same joystick may be used in a sprayer mission to direct spraying of an agricultural product.

Also illustrated is a communications system 69 suitable for connecting with a variety of external systems, including communications with the mission platform 12. The communications system 69 may include wired and/or wireless components having a suitable communication protocol, such as a standard protocol (e.g., Wi-Fi, Bluetooth, Mesh networks, etc.) or a proprietary protocol. The control system 26 may also include a spatial locating device 72, which is mounted to the multipurpose vehicle 10 and configured to determine a position of the multipurpose vehicle 10. As will be appreciated, the spatial locating device may include any suitable system configured to determine the position of the off-road vehicle, such as a global positioning system (GPS), for example. In certain embodiments, the spatial locating device 72 may be configured to determine the position of the off-road vehicle relative to a fixed point within the field (e.g., via a fixed radio transceiver). Accordingly, the spatial locating device 72 may be configured to determine the position of the off-road vehicle relative to a fixed global coordinate system (e.g., via the GPS) or a fixed local coordinate system. The spatial locating device 72 may additionally include accuracy enhancements, such as a real time kinematic (RTK) system configured to use phase signals to enhance, for example, the GPS-derived position.

As mentioned earlier, the multipurpose vehicle 10 may include a 4-wheel steering system enabling each wheel to independently rotate, for example, 360 degrees or more. Accordingly, a steering control system 74 is provided, which may coordinate turning of the wheels 48 to provide for various steering control modes. For example, a crab control mode 76 may enable the multipurpose vehicle 10 to "slide" sideways as opposed to turning in a traditional way where two front wheels are rotated. The crab mode 76 control may rotate all four wheels 48, for example, 90 degrees, and thus enable the multipurpose vehicle 10 to move sideways, as further described below. A normal mode control 78 may be used for traditional turning, such as when two front wheels 48 are rotated to turn the multipurpose vehicle 10.

An autonomous control system 80 may interface with and/or include the steering control system 74 to provide for unmanned operations. For example, the autonomous control system 80 may steer the multipurpose vehicle 10 to follow a selected/planned route through the field with the aid of the spatial locating device 72. The autonomous control system 80 may also include an engine output control system 82 suitable for controlling engine parameters such as fuel delivery that may then result in an engine output parameter such as revolutions per minute (RPM). The autonomous control system 80 may further include a transmission control system 84 used in changing drive train gears to more efficiently move the multipurpose vehicle 10, for example, through the field. Additionally, the autonomous control system 80 may include braking control system 86 suitable for applying braking to slow or otherwise stop the multipurpose vehicle 10.

During the autonomous (or manned) drive, the controller 60 may communicate with a controller 88 included in the control system 28 of the mission platform 12. For example, the communications system 69 may communicatively interface with a communications system 90 included in the control system 28. The controllers 60, 88 may then coordinate actuation of the actuators 32, 36, for example, based on data received via the sensors 30, 34. Accordingly, as the multipurpose vehicle 10 is operated, the mission platform 12 may engage sprayers to spray agricultural products, seeders to plant seed, motors to move grain, pumps to move fluids, and so on.

The controller 88 may include a processor, such as an illustrated microprocessor 92, and a memory 94. The controller 88 may also include one or more storage devices and/or other suitable components. The processor 92 may be used to execute software, such as software for controlling the mission platform 12, and so forth. Moreover, the processor 92 may include multiple microprocessors, one or more "general-purpose" microprocessors, one or more special-purpose microprocessors, and/or one or more application specific integrated circuits (ASICS), or some combination thereof. For example, the processor 92 may include one or more reduced instruction set (RISC) processors.

The memory 64 may include a volatile memory, such as random access memory (RAM), and/or a nonvolatile memory, such as ROM. The memory 94 may store a variety of information and may be used for various purposes. For example, the memory 94 may store processor-executable instructions (e.g., firmware or software) for the processor 92 to execute, such as instructions for operating the mission platform 12. The controller 88 may be coupled to a user interface 96 having a display 98. The user interface 96 may include input devices, such as touchscreens, joysticks, trackballs, keyboards, mice, microphones, and the like, useful in controlling the multipurpose vehicle 10 and/or the mission platform 12. The display 98 may be used to present a graphical user interface suitable for operations of the multipurpose vehicle 10 and/or the mission platform 12.

A docking control system 100 is also provided. In use, the docking systems 66, 100 may coordinate extension/retraction of the stowable support structure(s) 42, tilting, lowering/raising of the bed 14, and locking/unlocking of the attachment systems 22 to both dock the mission platform 12 to the multipurpose vehicle 10 and/or to undock the mission platform 12 from the multipurpose vehicle 10. Further, the docking systems 66, 100 may coordinate with external systems such as agricultural fluid pumping units, seed storage units, grain storage elevators, on-road vehicles, and the like, to perform loading and/or offloading operations via the multipurpose vehicle 10 and the mission platform 12. It is to be noted that the control system 26, 28 may use an ISOBUS, CAN bus, MULTIBUS, and/or similar systems/protocols to communicate with its various components (and each other). It is further to be noted that the systems 66, 74, 80, 100 may be software systems implemented as computer code executable via the processors 62, 92 and stored in the memories 64, 94, may be hardware systems, or a combination thereof.

Figure 3:
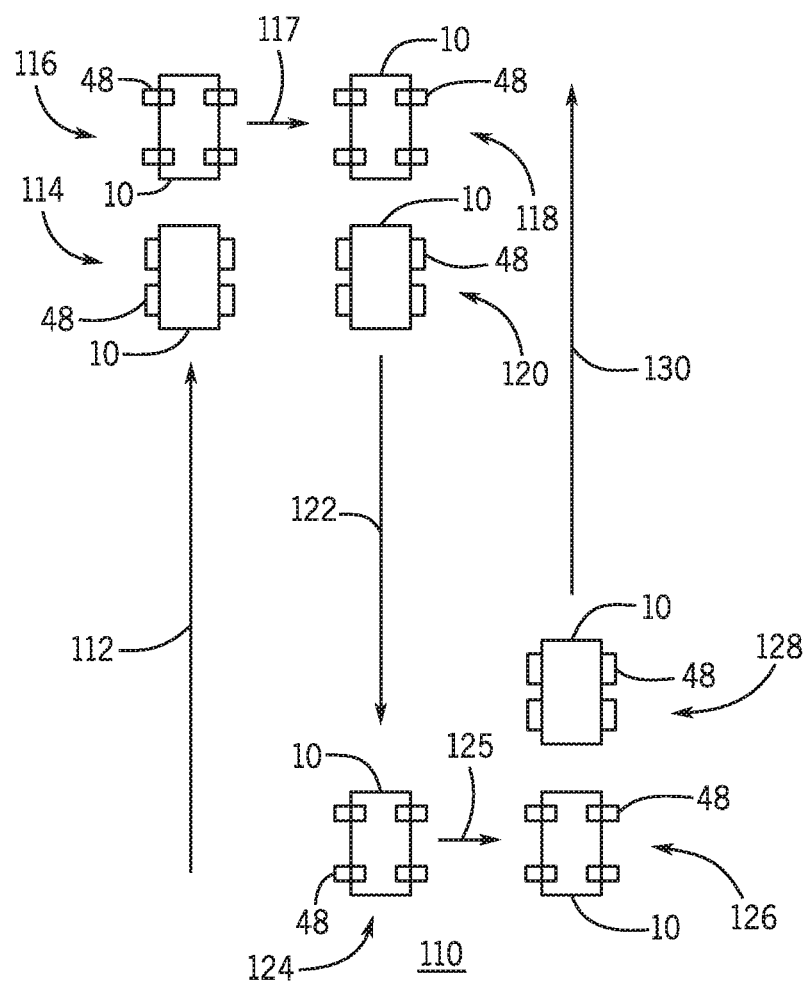
FIG. 3 is a diagram of a field being traversed by an embodiment of the multipurpose vehicle of FIG. 1.

FIG. 3 is a top view block diagram illustrating embodiments of the multipurpose vehicle 10 being driven in an agricultural field 110 via the crab mode control 76 and the normal mode control 78. In the depicted embodiment, the multipurpose vehicle 10, which may additionally include the mission platform 12, may be located at location 114 after driving in the normal mode control 78 through segment 112. When the multipurpose vehicle 10 reaches location 116, the wheels 48 may all be rotated 90 degrees. The multipurpose vehicle 10 may then "slide" via segment 117 into position 118 (e.g., via crab mode control 76) as opposed to turning. The multipurpose vehicle 10 may then rotate wheels 48 again, for example, 90 degrees. The multipurpose vehicle 10 may then be driven, as shown in position 120, through segment 122 in normal mode control 78. By sliding from position 116 into position 118 as opposed to traditional turning, more of the field 110 may be used and a distance between segments 112 and 122 may be closer. It is to be noted that the multipurpose vehicle 10 may provide for equal mission support both when moving forward as well as when moving backwards.

Once the multipurpose vehicle 10 reaches position 124, the wheels 48 may again be rotated, and the multipurpose vehicle 10 may slide via segment 125 into position 126. The wheels 48 may be rotated again, as shown in position 128, and the multipurpose vehicle 10 may be driven through segment 130. By repeatedly traversing the field 110, for example, in segments 112, 117, 122, 125, 130, the multipurpose vehicle 10 may cover more area in the field 110 in a more efficient manner.

Figure 4:
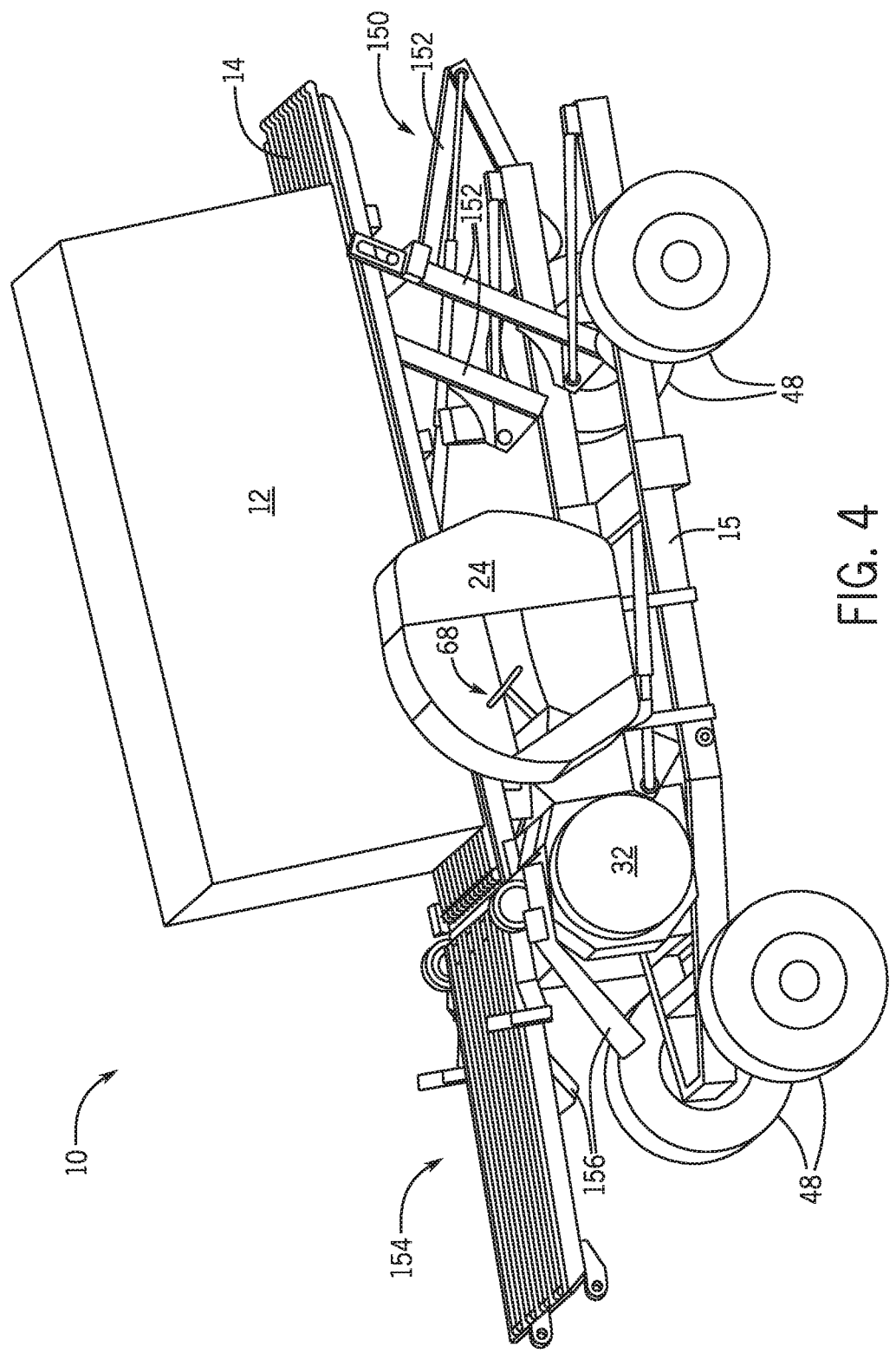
FIG. 4 is a perspective view of the multipurpose vehicle of FIG. 1, in accordance with an embodiment of the present disclosure.

It may be beneficial to show further details of the multipurpose vehicle 10 and the mission platform 12. Accordingly, FIG. 4 illustrates a perspective view on an embodiment of the multipurpose vehicle 10 having the mission platform 12 already docked. In the illustrated embodiment, the multipurpose vehicle 10 includes the cab 24 suitable for driving the multipurpose vehicle 10. For example, a human operator may enter the cab 24 and find a variety of controls such as controls provided by the user interface 68, to operate the multipurpose vehicle 10 having the attached mission platform 12. As mentioned above, the mission platform 12 may be fastened onto the vehicle bed 14. In the depicted embodiment, the vehicle bed 14 is shown as both raised and angled, for example, by using a lifting system 150.

The lifting system 150 may include lifting members 152 suitable for coupling with and lifting the vehicle bed 14. The lift members 152 may be hydraulically powered, electrically powered, mechanically powered or a combination thereof. Also shown are the power unit 38 which may provide power to the lift members 152 as well as to the wheels 48. Illustrated near a forward section of the vehicle 10 is a loading ramp system 154 that may be used in certain applications, such as cotton module moving applications. The loading ramp system 154 may be available from CNH Industrial having corporate offices in London, United Kingdom, as a component of a Module Express™ system. In use the loading ramp system 154 may couple the multipurpose vehicle 10 to another vehicle or a structure and enable the transfer of the mission platform 12 to the other vehicle or structure, or vice versa. For example, the loading ramp system 154 may be attached to the other vehicle, and then subsequently positioned to abut the vehicle bed 14 via ramp guides or aprons 156. Indeed, the multipurpose vehicle 10 may include a variety of techniques useful in docking/undocking with the mission platform 12, including ramps, attached cranes, lift adjustment systems, and so on.

Turning now to FIG. 5, the figure illustrates a front view of an embodiment of a 4-wheel steering system 160 which may include techniques enabling each wheel 48 to independently rotate, for example, 360 degrees or more. In the depicted embodiment, rotatable rods 162 connect the wheels 48 onto cylindrical bodies 164. The rotatable rods may rotate about axis 166, for example 360 degrees or more. In the depicted embodiment, the wheels 48 are illustrated as rotated 90 degrees so as to provide for sideways movement in directions 168 without having to turn the multipurpose vehicle 10. As noted above, this "crab" type of movement may advantageously provide for more coverage of the field 110 while operations are being conducted. Suspension members 170 may enable the multipurpose vehicle 10 to traverse a variety of terrain by providing for independent up and down movement (e.g., steep slope features) of the wheels 48. Shock absorbers 172 may additionally provide for adaptive terrain buffering of the multipurpose vehicle 10 as the multipurpose vehicle 10 encounters bumps and other uneven terrain. Shock absorbers 172 may additionally provide for adaptive terrain buffering of the multipurpose vehicle 10 as the multipurpose vehicle 10 encounters bumps and other uneven terrain.

It is to be noted that the embodiment of the 4-wheel steering system 160 is shown as an example only, as the 4-wheel steering system 160 may be provided in a variety of embodiments having independent suspension and rotatable wheels 48. The wheels 48 may be coupled to the power unit 38 to receive rotative power. For example, hydrostatic wheel drive power, mechanical power, hydraulic power, electrical power, and so on, may be provided by the power unit 38 useful in rotating the wheels 48. In this manner, the 4-wheel steering system 160 may provide for ground clearance and terrain buffering across a variety of terrain types while moving the multipurpose vehicle 10 at a variety of angles without turning.

While only certain features of the invention have been illustrated and described herein, many modifications and changes will occur to those skilled in the art. It is, therefore, to be understood that the appended claims are intended to cover all such modifications and changes as fall within the true spirit of the invention.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A vehicle system, comprising:
 a chassis,
 a vehicle bed coupled to the chassis, the vehicle bed comprising an attachment system configured to fasten a detachable mission platform and a second detachable mission platform onto the vehicle bed, wherein the detachable mission platform and the second detachable mission platform each comprise a foldable support structure configured to self-support the detachable mission platform and the second detachable mission platform;
 a plurality of wheels coupled to the chassis and configured to carry the chassis over a ground;
 and
 a control system comprising a processor configured to:
  determine a mission type for the detachable mission platform;
  communicate with the detachable mission platform to actuate at least one actuator of the detachable mission platform based on the mission type;
  detect a removal of the detachable mission platform from the vehicle bed and an attachment of the second detachable mission platform onto the vehicle bed;
  determine a second mission type for the second detachable mission platform; and
  execute a second mission-specific software for controlling an at least second actuator included in the second detachable mission platform based on the second mission type; wherein the mission type is different from the second mission type.

2. The system of claim 1, comprising an autonomous control system configured to autonomously drive the vehicle system with the detachable mission platform fastened onto the vehicle bed.

3. The system of claim 2, comprising a spatial locating device communicatively coupled to the processor and configured to provide a geographic location of the vehicle system for use by the autonomous control system during drive operations.

4. The system of claim 1, wherein the processor is configured to execute a mission-specific software for controlling the at least one actuator based on the mission type.

5. The system of claim 4, comprising the detachable mission platform, wherein the detachable mission platform comprises at least one sensor and the actuator, and wherein the processor is configured to actuate the at least one actuator based on sensor data received from the at least one sensor and on the mission type.

6. The system of claim 1, wherein the processor is configured to determine the mission type for the detachable mission platform by reading an RFID tag on the detachable mission platform, by communicating with a mission platform controller, or a combination thereof.

7. The system of claim 1, comprising a steering system communicatively coupled to the processor and mechanically coupled to the plurality of wheels, wherein the processor is configured to execute a crab mode control to drive the vehicle system in a sideways direction via the steering system.

8. The system of claim 7, wherein the steering system is configured to rotate each of the plurality of wheels independently 360 degrees.

9. The system of claim 1, comprising the detachable mission platform, wherein the detachable mission platform comprises a grain cart platform, a seeder platform, a sprayer platform, a cotton module, a tender, or a combination thereof.

10. The system of claim 1, wherein the detachable mission platform is configured for planting operations, wherein the second detachable mission platform is configured for harvesting operations, wherein the mission type comprises planting and wherein the second mission type comprises harvesting.

11. A vehicle system, comprising:
a chassis,
a first detachable mission platform comprising at least one actuator;
a second detachable mission platform comprising at least one second actuator, wherein the first detachable mission platform and the second detachable mission platform each comprise a foldable support structure configured to self-support the first detachable mission platform and the second detachable mission platform;
a vehicle bed coupled to the chassis, the vehicle bed comprising an attachment system configured to fasten the first detachable mission platform onto the vehicle bed;
a plurality of wheels coupled to the chassis and configured to carry the chassis over a ground;
a control system comprising a processor configured to:
determine a mission type for the first detachable mission platform;
communicate with the first detachable mission platform to actuate the at least one actuator of the first detachable mission platform;
detect a removal of the first detachable mission platform from the vehicle bed and an attachment of the second detachable mission platform onto the vehicle bed;
determine a second mission type for the second detachable mission platform; and
execute a second mission-specific software for controlling the at least second actuator based on the second mission type, wherein the mission type comprises a planting and wherein the second mission type comprises a harvesting.

12. The system of claim 11, wherein the first detachable mission platform comprises a mission control system configured to communicatively couple with the processor to actuate the at least one actuator.

13. The system of claim 11, wherein the first detachable mission platform comprises a sensor and wherein the processor is configured to actuate the at least one actuator based on the mission type and on sensor data received from the sensor.

14. The system of claim 11, comprising a docking system, wherein the docking system is configured to assist docking of the vehicle system to another system, to a structure, or to a combination thereof.

15. A vehicle system, comprising:
a chassis,
a vehicle bed coupled to the chassis, the vehicle bed comprising an attachment system configured to fasten a detachable mission platform and a second detachable mission platform onto the vehicle bed;
a plurality of wheels coupled to the chassis and configured to carry the chassis over a ground;
a steering system operatively coupled to the plurality of wheels and communicatively coupled to a control system; and
the control system comprising a processor configured to execute a crab mode control to drive the vehicle system in a sideways direction via the steering system, wherein the detachable mission platform is configured to provide planting operations and wherein the second detachable mission platform is configured to provide harvesting operations, wherein the detachable mission platform and the second detachable mission platform each comprise a foldable support structure configured to self-support the detachable mission platform and the second detachable mission platform.

16. The system of claim 15, wherein the steering system is configured to rotate each of the plurality of wheels independently 360 degrees.

17. The system of claim 15, wherein the processor is configured to autonomously drive the vehicle system to traverse a field in a plurality of up segments, down segments, and sideways segments, wherein at least the sideways segments are driven via the crab mode control.

18. The system of claim 15, wherein the steering system comprises a steep slope feature.

19. The system of claim 15, wherein the processor is configured to:
determine a mission type for the detachable mission platform; and
communicate with the detachable mission platform to actuate an at least one actuator of the detachable mission platform.

* * * * *